UNITED STATES PATENT OFFICE 1,989,014

ANTHRAX VACCINE

Mario Mazzucchi, Milan, Italy

No Drawing. Application July 20, 1934, Serial No. 736,218

10 Claims. (Cl. 167—78)

This invention relates to compositions containing biological products and being adapted for use by injection to impart immunity to living beings.

This invention is particularly adapted for use in the control of diseases of animals, among which is the important disease of anthrax. However, this invention is not to be limited to the treatment of animals, as my invention is of broader scope and the example given below of the treatment of anthrax is to be considered as illustrating the character of my invention.

It has been common practice heretofore, in the treatment of animals for the prevention of anthrax, to first provide a vaccine which was composed essentially of anthrax spores in a suitable saline or other solution. Sometimes such solutions contained glycerin or the like which acted to preserve the solution for a long period of time. Then the vaccine was injected into the animal, causing a reaction to take place which was more or less successful in producing immunity in the animal.

Such vaccines as have been heretofore used were not uniform or certain in their action. If they were too virulent they were dangerous and were likely to cause a serious or fatal form of disease in the animal. If the vaccine was too attenuated it was rather inefficient and did not impart a satisfactory degree of immunity in the animal. It was, furthermore, necessary to inject an animal several times at stated intervals, making the operation expensive, not only by the necessity of the additional injections, but also by reason of the necessity of rounding up the animals several times.

It is among the objects of this invention to provide a composition for injection purposes which is of great potency, which is practically completely successful in the immunizing of animals and which requires but a single injection of small volume of the composition for producing complete immunity.

After several years of experimentation I conceived the idea that probably the prime reason why prior vaccines were not satisfactory was because the spores diffused rapidly into the body of the animal being treated and either produced a severe form of disease or the organisms were destroyed without producing dependable immunity.

I conceived that if a substance would be found which wholly or partially prevented the absorption of the organism in the body of the host, or at least made such absorption very slow, it would give the body an opportunity of building up the desired immunity. This substance should have substantially no detrimental effect on the virulent germs or spores. In the course of my research I directed my attention particularly to substances which cause a defensive barrier to be set up in the body which would act to prevent diffusion of the injected organisms. To obtain this effect the substance used should cause marked inflammatory areas and œdema. At the same time in the subcutaneous connective tissue a gelatinous infiltration may be formed.

As one of the substances capable of performing this function and in fact the substance which I prefer to use because it is the best substance which I have so far found, is saponin. Saponin, particularly in a purified state, does not adversely affect the microorganism and in fact it has been said that it promotes the growth thereof. I have found that the bacillus and spore of anthrax retained their characteristic virulence and antigenic power in the presence of saponin.

Various substances are known, which will perform this function. For example, in the digitalis glucosides, we find in addition to the active cardiac principles, a group of substances which have a distinct saponin-like action. This group has been known as digitonin. Also, the following preparations contain substances adapted for use in the present invention to produce the defensive barrier: caulophyllum (blue cohosh), gum guaiac, quillaia (soap bark), saponaria (soap root), senega (snakeroot), sarsaparilla (smilax). Synthetic preparations as well as naturally occurring substances which are glucosides of various organic compounds give the desired body reactions in greater or less degree.

In actual practice I first provide a watery solution of anthrax spores and add to the same a specified quantity of saponin. The amount of saponin may vary within wide limits, but for practical purposes I usually confine myself to less than 10 per cent of saponin in the mixture. Preferably the amount of saponin is from 1 per cent to 5 per cent and I have found that 2 per cent of saponin in the solution gives excellent results. If the larger amounts of saponin are used, it may cause lesions at the point of injection of the vaccine, and may further cause sloughing. If too little saponin is used, it will not cause a sufficient reaction in the body to prevent the rapid diffusion of the spores.

The mixture is injected into the body of the animal to be immunized and such injection is subcutaneous. Immediately upon injection the reaction occurs, causing infiltration of gelatinous material in the subcutaneous tissues. The œdema thus produced is rapid and within a short time is followed by more solid infiltration. The saponin may be absorbed rather quickly into the body, but the infiltration persists for a considerable period of time preventing diffusion of the anthrax spores and the barrier thus formed prevents the spread of the infection. Thereafter the change of the spore into the bacillus causes the reaction of the body to produce antibodies, thus imparting immunity.

In time and after the immunization has taken place there is a very slow re-absorption of the infiltration and it is transformed into a relatively small connective tissue mass.

By the use of substances of the type herein described I am enabled to make vaccines with spores of greater virulence. It is also feasible to make vaccines of greater potency than heretofore. For example, I may use a vaccine containing as many as ten million spores per cubic centimeter, although I have found that excellent results may be obtained using two or two and one half million spores per cubic centimeter. Even this is far in excess of the number of organisms of the same type of virulence which can be successfully used according to old methods. By the use of stronger vaccines much more certain immunization is obtained and at the same time because of the presence of the aforesaid substance there is no danger of the development of the disease in the animals. Because of the stronger vaccines I may use very small quantities thereof and still obtain perfect results. I have used with great success one-eighth cc. for the immunization of sheep and one-fourth cc. for the immunization of horses and cattle.

By many tests I have found that animals immunized by one injection of the present composition may, with perfect safety, be injected with large doses of virulent anthrax without fatal results. On the other hand, animals immunized by old methods, when injected with virulent anthrax in the same amounts, were fatally stricken with the disease.

In my experimentations I have successfully vaccinated hundreds of thousands of animals with my new composition with excellent results. In two years, in two sets of experiments, I vaccinated over 530,000 animals. As a result, the vaccination has been substantially completely successful and there were no reported deaths of animals which were attributable to the vaccine, nor were there any cases of anthrax following the single vaccination, either in immune zones or in infected localities.

Although I have described my invention setting forth the use of the principles constituting the basis thereof in the immunization of animals against anthrax, my invention may be useful not only in the treatment of animals but also of human beings. The field of usefulness of my invention will be apparent to those skilled in the art and I claim as my invention the idea of utilizing a substance to produce the infiltrations and thus increase the efficiency of immunizing injections.

The invention is not limited to the use of the substances named above to produce the defensive barrier as it will be merely a matter of trial to determine which substances have the desired effect on the body. The amount of vaccine injected into the body may be varied within wide limits, although the amount is generally dependent upon the weight and size. Spores of various degrees of virulence may be used but I prefer to use more virulent strains, whereby greater immunity is conferred. The concentration of spores may vary from 1,000,000 per cc. up to 10,000,000 per cc. or even higher, as desired. The scope of my invention is to be limited only by the claims appended hereto.

In the claims by anthrax spore material I mean live organisms, and they need not be either partially or wholly in the spore stage as the active organisms are equally suitable for conferring immunity. However, for most purposes, the spore form is the more desirable to use.

This application is a continuation in part of my copending application Serial No. 661,843, filed March 20, 1933.

What I claim is:

1. A composition for injection purposes comprising viable anthrax spore material in a medium containing saponin.

2. A composition for injection purposes comprising viable anthrax spore material in a medium containing saponin, the amount of saponin being not over ten per cent.

3. A composition for injection purposes comprising viable anthrax spore material in a medium containing saponin, the amount of saponin being from 1 per cent to 5 per cent.

4. A composition for injection purposes comprising viable anthrax spore material in a medium containing saponin, the amount of saponin being about 2 per cent.

5. A composition for injection purposes comprising viable anthrax spore material in a medium containing saponin, said organisms being virulent and the concentration thereof being at least 1,000,000 per cc.

6. A composition for injection purposes comprising viable anthrax spore material in a medium containing saponin, said organisms being virulent and the concentration thereof being at least 2,500,000 per cc.

7. A composition for injection purposes comprising viable anthrax spore material in a medium containing a substance which acts like saponin in admixture with said material to induce the animal into which the composition is injected, to form a defensive barrier in the body, which barrier acts to prevent substantial diffusion of said material.

8. The composition of claim 7 in which the amount of substance contained is not over 10 per cent.

9. A composition for injection purposes comprising viable anthrax spore material in a medium containing a substance selected from the group consisting of digitonin, caulophyllum, gum guaiac, quillaia, saponaria, senega, sarsaparilla and saponin.

10. A composition of claim 9 in which the substance is present in an amount not over 10 per cent.

MARIO MAZZUCCHI.